Dec. 12, 1933.  J. A. RYDMARK ET AL  1,939,368
BIN INDICATOR
Filed Nov. 29, 1929  3 Sheets-Sheet 1
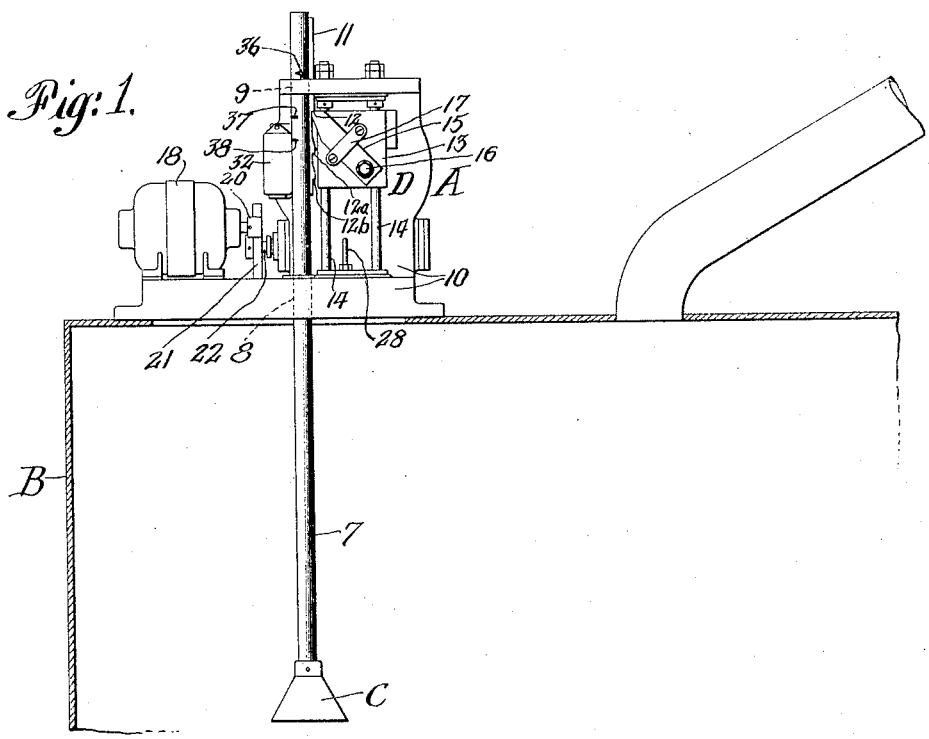
INVENTORS
Harvey C. Mittendorf and
BY Josef A. Rydmark
Synnestvedt & Lechner
ATTORNEYS Dec. 12, 1933.    J. A. RYDMARK ET AL    1,939,368
BIN INDICATOR
Filed Nov. 29, 1929    3 Sheets-Sheet 2
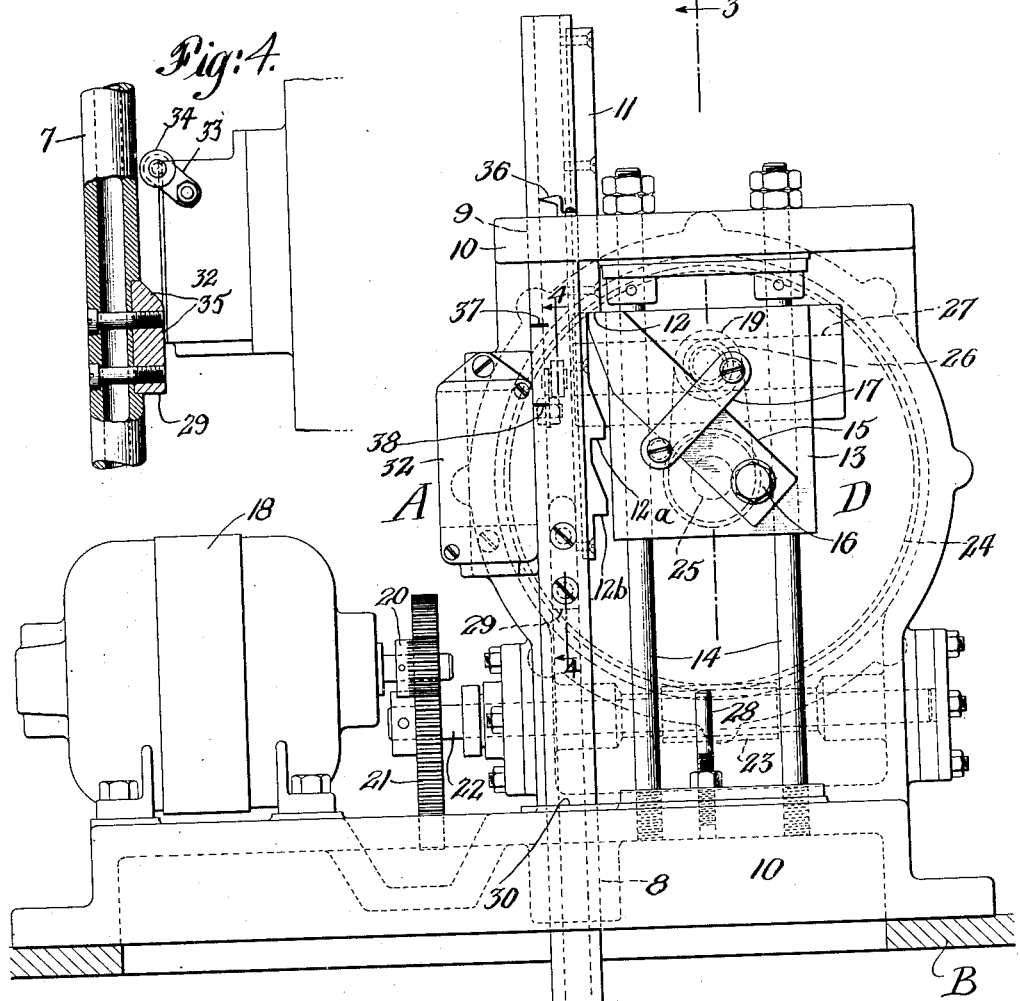
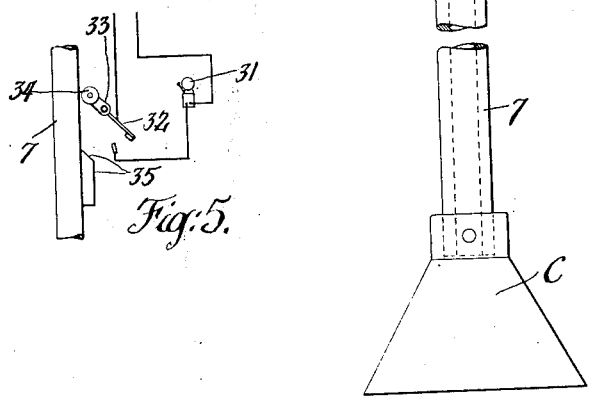
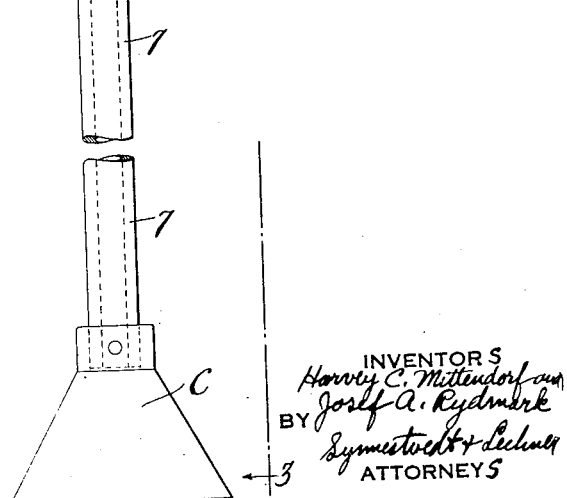

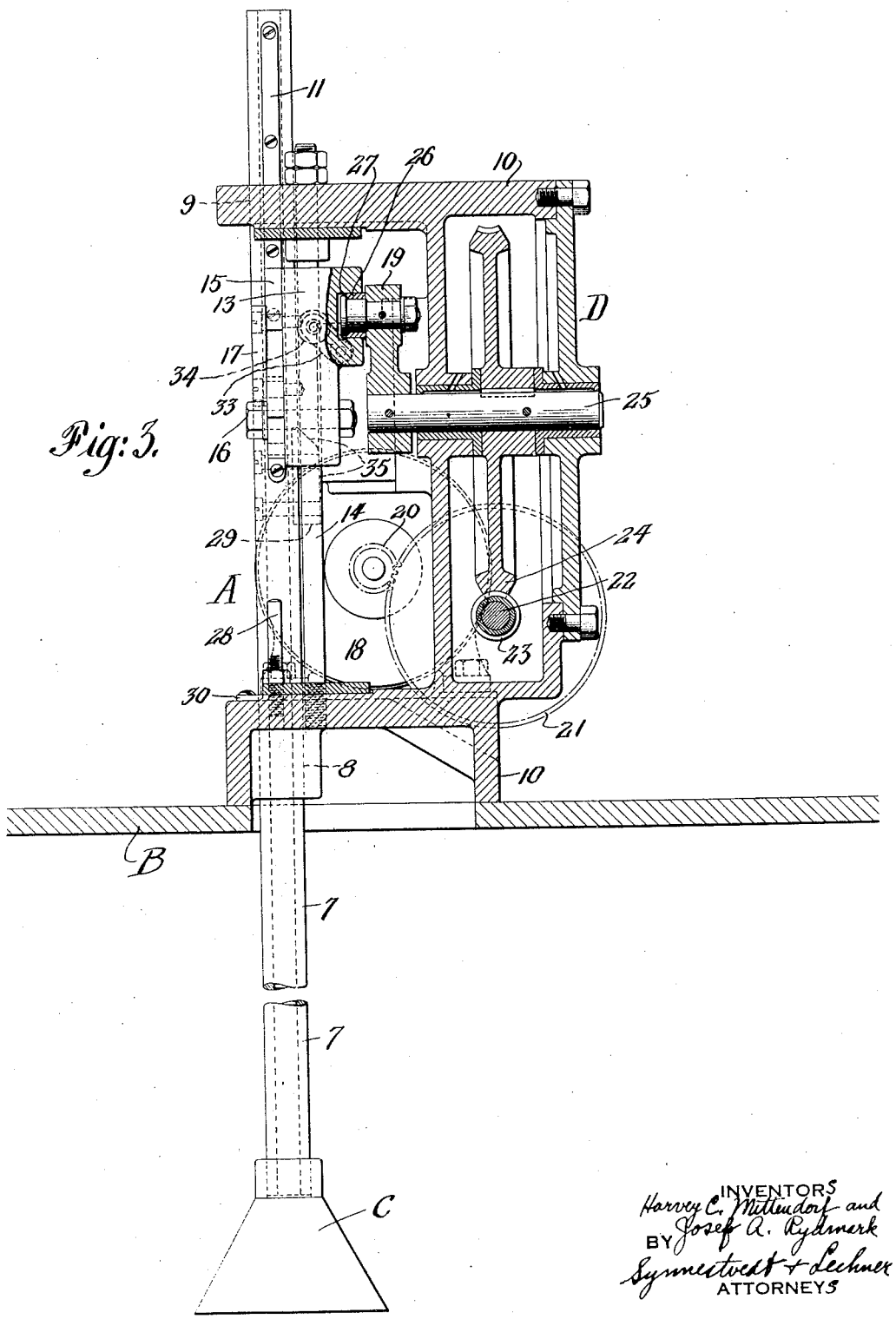

Patented Dec. 12, 1933

1,939,368

UNITED STATES PATENT OFFICE 1,939,368

BIN INDICATOR

Josef A. Rydmark, New York, N. Y., and Harvey C. Mittendorf, East Orange, N. J., assignors to International Combustion Engineering Corporation, New York, N. Y., a corporation of Delaware Application November 29, 1929
Serial No. 410,547

5 Claims. (Cl. 33—125)

This invention relates to bin indicators for finely divided material storage bins, such, for example, as storage bins for pulverized coal which is to be burned in suspension.

One of the primary objects of our invention is to provide an improved bin indicator which is of very simple construction, inexpensive to manufacture and which is automatic in operation.

Another object of our invention is the provision of a bin indicating device which may be used to give an indication of the level of the material throughout the full height of the bin, or which, in its simplest form, will give the indication only when the bin approaches fullness.

A more specific object of our invention is the provision of very simple and effective means for operating a reciprocating cone which is adapted to rest on the material in the bin in such a manner that an indication of the level of the material will be given.

How the foregoing, together with such other objects and advantages as may hereinafter appear, or are incident to our invention, are realized, is illustrated in preferred form in the accompanying drawings, wherein—

Fig. 1 is in part an elevational and in part a sectional view illustrating the application of our invention to a bin, only a portion of which is shown.

Fig. 2 is an enlarged elevational view of the device.

Fig. 3 is a cross section of the device taken substantially on the line 3—3 of Fig. 2, with certain of the parts appearing in elevation.

Fig. 4 is a fragmentary sectional view of a detail of our invention, the section being taken substantially on the line 4—4 of Fig. 2.

Fig. 5 is a fragmentary diagrammatic view illustrating a simple form of signal or indicating device which we employ, and Referring to the drawings, our improved bin indicator A is shown mounted on the top of the storage bin B and comprises, in general, a member C in the form of a cone supported or carried by a rod or bar 7 which extends downwardly into the bin. Although the member C is referred to as a cone, it is to be understood that it may be of any shape, so long as it presents sufficient surface to adapt it to rest on the material in the bin. The rod 7 is guided for up and down movement at 8 and 9 in the main frame structure 10 of the device, and is provided with a ratchet plate 11 having a plurality of notches or teeth. In the particular form shown in Figs. 1 to 5 inclusive, the bar 7 is relatively short as compared to the height of the bin and the ratchet plate thereof is provided with three notches 12, 12a and 12b. With the form of device illustrated in these figures, it is only intended to obtain high level indications, but it is to be understood that indications for the full height of the bin may be obtained by providing a longer bar provided with a greater number of notches. Such an arrangement will be described more fully hereinafter as it will be better understood after the full operation of the simpler form has been described.

The cone C with its supporting bar 7 is caused to reciprocate up and down by means of actuating mechanism indicated as a whole by the reference letter D, which mechanism comprises a crosshead 13 mounted on the crosshead guides 14 and carrying a pawl-like member 15 pivoted at 16 on the crosshead and guided by a strap 17. The crosshead 13 is shown at the top of its stroke and the pawl 15 is shown engaging the uppermost notch 12 of the ratchet 11.

A motor 18, which may be of small size, say, for example, ⅛ H. P., is employed for the purpose of reciprocating the crosshead through the medium of reduction gearing and a crank 19. The reduction gearing in this instance comprises a pinion 20 on the motor shaft meshing with a gear 21 on a worm shaft 22 carrying a worm 23 in turn driving the worm wheel 24. The worm wheel shaft 25 carries the crank 19 having a pin or roller 26 working in the groove 27 in the adjacent face of the crosshead 13. Thus, as the crank rotates, the crosshead is reciprocated as is also the pawl 15.

As the crosshead approaches the bottom of its stroke, the pawl 15 engages the stop pin 28, is caused to pivot about the pin 16, and is disengaged from the notch of the ratchet, thus allowing the cone with its support to fall. In order to prevent the cone and its bar 7 from falling to a point in which the pawl would not engage the uppermost notch in the ratchet on its next upward stroke, we have provided means for limiting the downward movement which, in this instance, comprises a member 29 projecting from the bar 7 and adapted to come into engagement with a plate 30 on the upper surface of the bed plate portion of the frame structure 10. It will become apparent hereinafter that the member 29 in this instance is of a form to serve another purpose also.

Assuming now that the level of the material in the bin is below the lowermost point to which the cone drops, the operation of the device as thus far described is as follows. On the down stroke of the crosshead and pawl the cone and bar 7 drop until the member 29 engages the stop plate 30. The plate and stop are so relatively positioned that the downward movement of the bar 7 is stopped slightly before the pawl reaches the end of its down stroke. During the final part of the downward stroke the pawl engages the stop pin 28 and is released from the ratchet, and during the first part of the up stroke the ratchet again engages the notch 12 and the bar 7 is lifted to the top of the stroke by the pawl. The above reciprocating action is repeated until the level of the material rises to a point above the lowermost position normally taken by the cone.

Let us assume now that the level of the material rises above the normal lower position of the cone, then the cone on its down stroke will rest on the material which arrests its downward movement. The pawl, however, because of its having a fixed stroke, continues downwardly to the bottom of its stroke, and in so doing ratchets past the notch 12a, assuming the rise in the material is substantially equal to the spacing of the notches, and then on its upstroke the pawl engages notch 12a and carries with it the bar 7 and cone C, the length of the upstroke being the same as before but starting from a point higher up. Should the level of the material remain unchanged the cone will merely continue to reciprocate through the stroke just mentioned.

If the level of the material should rise still more, however, the cone on its downward stroke will be arrested at the new level and the next notch 12b will be engaged, causing the upstroke to start from this new level.

In the event that the level of the material rises still higher the cone will soon reach a high position in which the ratchet teeth will be above the effective range of the pawl, and consequently reciprocation of the cone will cease.

On the other hand, should the level of the material in the bin fall, then the cone is permitted to drop accordingly because of the release of the pawl by the stop 28.

From the foregoing it will be seen that when material is flowing into the bin and has reached the level to or above the lowest position to which the cone descends, the cone will always be set onto the material and will not be dropped thereon. This prevents the cone from becoming embedded in the material in the bin and is particularly useful in a device of the kind illustrated in the drawings because of the fact that the rod 7 is not counterbalanced by a counterweight and the weight of the parts is such that the cone becomes embedded if allowed to drop for any substantial distance.

When the material reaches the levels where the bin is approaching fullness, in order to be apprised of this fact, we propose to associate indicating means with the device, which may be in the form of a bell, light, or the like. In the drawings the indicating means comprises a bell 31 (see Fig. 5) controlled by a suitable normally open switch 32 which, in turn, is controlled by a cam actuated lever 33 carrying a roller 34.

The cam surface 35 which operates on the roller 34 of the lever 33 to actuate the switch 32 is formed on the projecting member 29 hereinbefore described, and is so located with respect to the location of the lever 33 that the lever is not actuated when the pawl 15 is in engagement with the uppermost notch 12, and, therefore, no signal is given. However, the relation of the parts is such that the lever is actuated to close the switch when the pawl is in engagement with either of the other notches, in which case the switch actuation takes place toward the end of each upstroke and gives an intermittent signal. When the bin is filled to the level above mentioned, in which reciprocation of the cone ceases, the cam holds the switch closed and gives a continuous signal indicating that feed of material to the bin should be cut off.

In Fig. 2 we have also illustrated a simple form of sight indicator which may be employed comprising a fixed pointer 36 which may be secured to the frame 10 at a point adjacent the bar 7, and markings 37 and 38 which will register with the pointer when the notches 12a and 12b are engaged by the pawl, the marking 37 being for the notch 12a and the marking 38 for the notch 12b.

As above pointed out, the invention may very readily take a form in which it is suitable for giving indications for the full height of the bin by merely making the rod 7 longer and providing it with a multiplicity of notches. In such form each time the level of material in the bin rises a lower notch is engaged by the pawl and the point of starting of the upstroke of the cone rises. Markings such as the markings 37 and 38 shown in Fig. 2 may be provided for each notch, thus indicating the level at which the material is in the bin. An alarm signal for full bin indication such as described in connection with the simpler form of our invention may also be employed. The elevation of the cone bar 7 may be a measure of the material level.

It is pointed out by way of example that the lowest position of the cone may be approximately 24 inches from the top of the bin and that the stroke imparted to the cone may be approximately 5 inches. When the bin approaches fullness, say when the level of the material rises 3 inches above the lowest position of the cone, the stroke of the cone will still be 5 inches, but the low point of the stroke is raised 3 inches. When traveling through this stroke the signal is operated intermittently. At high levels, say 2 inches higher, the low point is raised 2 inches and the full 5 inch stroke continues, still giving an intermittent signal. At higher levels, however, the cone is held up by the material in the bin in a position that the signal operates continuously. When the material level lowers the return cycle is gone through until the next filling.

We claim:

1. A bin indicating device comprising, in combination, a cone, a ratchet bar carrying the cone, a pawl engageable with the ratchet bar, means for reciprocating the pawl to raise and lower the ratchet bar and its cone means operating on the pawl as it approaches the bottom of its stroke to release it from the ratchet bar, stop means limiting the bar and cone in its downward movement when the pawl is released and when the level of the material in the bin is low, said stop means being ineffective when the level of the material approaches the top of the bin in which case the material determines the point to which the cone will lower, and means adapted to be operated when the bin approaches fullness to give an indication thereof.

2. An indicating device for bins to indicate when the bin approaches fullness as it is being filled comprising a member adapted to rest on material in the bin, a ratchet bar connected thereto, stop means limiting downward movement of said member and ratchet bar, a pawl adapted to engage said ratchet bar, means reciprocating the pawl, said pawl when reciprocating causing the ratchet bar and member to raise and permitting them to lower at the same rate of movement as the pawl to a point where the said member rests on material in the bin when the said material has risen to or above the lowest position of said member and an indicating device asociated with the ratchet bar.

3. An indicating device for bins to indicate when the bin approaches fullness as it is being filled comprising a member adapted to rest on material in the bin, a ratchet bar connected thereto, stop means limiting downward movement of said member and ratchet bar, a pawl adapted to engage said ratchet bar, means reciprocating the pawl, said pawl when reciprocating causing the ratchet bar and member to raise and permitting them to lower at the same rate of movement as the pawl to a point where the said member rests on material in the bin when the said material has risen to or above the lowest position of said member, means disengaging the pawl from the ratchet bar near the lower end of the vertical stroke of the pawl and an indicating device associated with the ratchet bar.

4. An indicating device for bins to indicate when the bin approaches fullness as it is being filled comprising a member adapted to rest on material in the bin, a rod connected thereto, stop means limiting downward movement of the rod, reciprocating clutch means engaging said rod to positively raise it and to impositively lower it to a point where the member rests on material in the bin when the said material has risen to or above the lowest position of said member and indicating means associated with said rod.

5. An indicating device for bins to indicate when the bin approaches fullness as it is being filled comprising a member adapted to rest on material in the bin, a rod connected thereto, stop means limiting downward movement of the rod, reciprocating clutch means engaging said rod to positively raise it and to impositively lower it to a point where the member rests on material in the bin when the said material has risen to or above the lowest position of said member and means disengaging said reciprocating means from said rod near the lower end of the vertical stroke of the reciprocating means and an indicating device asociated with said rod.

JOSEF A. RYDMARK.
HARVEY C. MITTENDORF.